(12) United States Patent
Schaffer et al.

(10) Patent No.: US 7,937,725 B1
(45) Date of Patent: May 3, 2011

(54) THREE-WAY MEDIA RECOMMENDATION METHOD AND SYSTEM

(75) Inventors: J. David Schaffer, Wappingers Falls, NY (US); Kwok Pun Lee, Yorktown Heights, NY (US); Srinivas Gutta, Buchanan, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 3166 days.

(21) Appl. No.: 09/627,139

(22) Filed: Jul. 27, 2000

(51) Int. Cl.
*H04N 5/445* (2006.01)

(52) U.S. Cl. ............... 725/46; 725/26; 725/47; 705/14

(58) Field of Classification Search ............ 725/46, 725/47, 26; 705/10, 14, 26
See application file for complete search history.

(56) References Cited

U.S. PATENT DOCUMENTS

| | | | | | |
|---|---|---|---|---|---|
| 5,223,924 A | * | 6/1993 | Strubbe | | 725/46 |
| 5,410,344 A | * | 4/1995 | Graves et al. | | 725/46 |
| 5,446,891 A | * | 8/1995 | Kaplan et al. | | 395/600 |
| 5,483,278 A | * | 1/1996 | Strubbe et al. | | 725/61 |
| 5,754,939 A | | 5/1998 | Herz et al. | | |
| 5,758,257 A | | 5/1998 | Herz et al. | | |
| 5,778,135 A | * | 7/1998 | Ottesen et al. | | 386/52 |
| 5,798,785 A | * | 8/1998 | Hendricks et al. | | 348/1 |
| 5,848,396 A | * | 12/1998 | Gerace | | 705/10 |
| 5,857,181 A | | 1/1999 | Augenbraun et al. | | |
| 5,867,799 A | * | 2/1999 | Lang et al. | | 707/1 |
| 5,884,282 A | * | 3/1999 | Robinson | | 705/27 |
| 5,903,314 A | * | 5/1999 | Niijima et al. | | 725/44 |
| 5,977,964 A | * | 11/1999 | Williams et al. | | 345/327 |
| 5,978,766 A | * | 11/1999 | Luciw | | 705/1 |
| 6,005,597 A | * | 12/1999 | Barrett et al. | | 348/1 |
| 6,038,367 A | | 3/2000 | Abecassis | | |
| 6,064,980 A | * | 5/2000 | Jacobi et al. | | 705/26 |
| 6,088,722 A | * | 7/2000 | Herz et al. | | 709/217 |
| 6,112,186 A | * | 8/2000 | Bergh et al. | | 705/10 |
| 6,133,909 A | | 10/2000 | Schein et al. | | |
| 6,163,316 A | * | 12/2000 | Killian | | 715/721 |
| 6,177,931 B1 | * | 1/2001 | Alexander et al. | | 345/327 |
| 6,236,978 B1 | * | 5/2001 | Tuzhilin | | 705/26 |
| 6,256,633 B1 | * | 7/2001 | Dharap | | 707/10 |

(Continued)

FOREIGN PATENT DOCUMENTS

EP 1337110 A1 8/2003

(Continued)

OTHER PUBLICATIONS

Smyth et al., "Surfing the Digital Wave: Generating Personalised TV Listings Using Collaborative, Case-Based Recommendation", pp. 1-11, Department of Computer Science, University College, Dublin.

(Continued)

*Primary Examiner* — Son P Huynh
(74) *Attorney, Agent, or Firm* — Edward W. Goodman

(57) ABSTRACT

An electronic programming guide (EPG) system employing a preference engine and processing system that combines explicit rule profile, history profile, and feedback profile data to generate new predictions. Television shows are presumed to be indexed by many features. These features are extracted and counted for TV shows watched (implicit profile), and for TV shows rated by the viewer (feedback profile). These profiles are straightforward to combine with suitably greater weight being given to the feedback information. In addition, explicit profiles can make recommendations that stand alone or may be used to modify recommendations arising from either of the two sources. The modifications may take the form of additive or multiplicative changes to the existing recommendations or some other suitable mathematical form.

26 Claims, 8 Drawing Sheets

U.S. PATENT DOCUMENTS

| | | | |
|---|---|---|---|
| 6,317,881 B1 | 11/2001 | Shah-Nazaroff et al. | |
| 6,334,127 B1 * | 12/2001 | Bieganski et al. | 707/5 |
| 6,408,437 B1 * | 6/2002 | Hendricks et al. | 725/132 |
| 6,425,128 B1 * | 7/2002 | Krapf et al. | 725/37 |
| 6,438,579 B1 * | 8/2002 | Hosken | 709/203 |
| 6,445,306 B1 * | 9/2002 | Trovato et al. | 340/825.24 |
| 6,446,261 B1 * | 9/2002 | Rosser | 725/34 |
| 6,457,010 B1 * | 9/2002 | Eldering et al. | 707/10 |
| 6,460,036 B1 * | 10/2002 | Herz | 707/10 |
| 6,463,585 B1 * | 10/2002 | Hendricks et al. | 725/35 |
| 6,530,083 B1 * | 3/2003 | Liebenow | 725/46 |
| 6,584,466 B1 * | 6/2003 | Serbinis et al. | 707/10 |
| 6,637,029 B1 * | 10/2003 | Maissel et al. | 725/46 |
| 6,662,177 B1 * | 12/2003 | Martino et al. | 707/3 |
| 7,073,193 B2 | 7/2006 | Marsh | |
| 7,363,649 B2 | 4/2008 | Marsh | |
| 2002/0199194 A1 | 12/2002 | Ali | |

FOREIGN PATENT DOCUMENTS

| | | | |
|---|---|---|---|
| EP | 1355241 A2 | 10/2003 | |
| EP | 1434435 A1 | 6/2004 | |
| EP | 1732013 A1 | 12/2006 | |
| EP | 1732019 A1 | 12/2006 | |
| EP | 1702466 B1 | 8/2008 | |
| FR | 2836321 A1 | 8/2003 | |
| GB | 2387676 A | 10/2003 | |
| WO | 9837696 A1 | 8/1998 | |
| WO | WO9837696 | 8/1998 | |
| WO | 0115449 A1 | 3/2001 | |
| WO | WO 01/15449 A1 * | 3/2001 | 7/173 |
| WO | 0211445 A1 | 2/2002 | |
| WO | 0225938 A2 | 3/2002 | |
| WO | 03105082 A2 | 12/2003 | |
| WO | 2004002209 A2 | 1/2004 | |
| WO | 2005067295 A1 | 7/2005 | |
| WO | 2006048791 A1 | 5/2006 | |

OTHER PUBLICATIONS

Kittler et al, "Combining classifiers", 1996, pp. 897-901, Proceedings of ICPR 1996, Surrey.

Huang et al, "Combination of multiple classifiers with measurement values", 1993, pp. 598-601, Concordia University, Montreal.

Ho et al, "Decision combination in multiple classifier systems", IEEE Transactions on Pattern Analysis and Machine Intelligence, 1994, pp. 66-75, vol. 16, No. 1.

Perrone et al, "When networks disagree: ensemble methods for hybrid neural networks", 1992, pp. 1-15, Brown University, Providence, Rhode Island.

Xu et al, "Methods of combining multiple classifiers and their application to handwriting recognition", IEEE Transactions on Systems, Man and Cybernetics, 1992, pp. 418-435, vol. 22, No. 3.

Seung et al, "Query by committee", 1992, pp. 287-294, Pennsylvania.

Lincoln et al, "Synergy of clustering multiple back propagation networks", pp. 650-657, UCLA.

Dietterich, "Ensemble methods in machine learning", pp. 1-15, Corvallis, Oregon.

Gutta et al, "Face recognition using hybrid classifiers", Pattern Recognition, 1997, pp. 539-553, vol. 30, No. 4.

Ratsch, "Ensemble-lernmethoden zur klassifikation", 1998, pp. 1-80, Potsdam University.

Gutta et al, "Mixture of experts for classification of gender, ethnic origin, and pose of human faces", IEEE, Transactions on Neural Networks, 2000, pp. 948-960.

Gutta, "Face and hand gesture recognition using hybrid learning", 2005, pp. 948-960, Ann Arbor, Michigan.

Tuma et al, Engineering Mathematics Hnadbook, 1998, pp. 1-3, Fourth Edition, McGraw-Hill.

* cited by examiner

THREE-WAY MEDIA RECOMMENDATION METHOD AND SYSTEM

BACKGROUND OF THE INVENTION

The present invention relates to systems that employ electronic program guides (EPGs) to assist media users in managing a large number of media-content choices, for example, television programming, chatrooms, on-demand video media files, audio, etc. More specifically, the invention relates to such systems that provide "intelligence", such as an ability to suggest choices and an ability to take actions, for example to record a program, on the user's behalf based on the user's preferences.

A common element among conventional Electronic Program Guide (EPG) systems is their ability to display listings of programs for many available channels. The listings may be generated locally and displayed interactively. The listings are commonly arranged in a grid, with each row representing a particular broadcast or cable channel, such as ABC, PBS, or ESPN and each column of the grid representing a particular time slot, such as 4:00 p.m. to 4:30 p.m. Multiple rows and multiple columns can be displayed on the screen simultaneously. The various scheduled programs or shows are arranged within the rows and columns, indicating the channels and times at which they can be found. The grid can be scrolled vertically so that a viewer can scan through different channels within a given interval of time. The grid may also be scrolled horizontally (panned) to change the time interval displayed.

Data regarding available programs may be received by a cable system or telephone line as a set of data records. Each available program may have a single corresponding data record containing information about the program such as its channel, its starting and ending times, its title, names of starring actors, whether closed-captioning and stereo are available, and perhaps a brief description of the program. It is not difficult to format a grid such as described above from these types of data records. The data spanning a period (e.g., two weeks) are typically formatted once at the server (e.g., the cable system's head-end) and broadcast repeatedly and continuously to the homes served by the cable system. Alternatively, the data may be downloaded via phone line, or other network, either on-demand or on a predetermined schedule.

An EPG system can run on a device with a user interface (hereinafter a "user interface device"), which can be a set-top box (STB), a general purpose computer, an embedded system, a controller within the television, or the server of a communications network or Internet server. The user interface device is connected to the TV to generate displays and receive input from the user. When scrolling to a new column or row, the user interface device may retrieve appropriate information from a stored database (in the user interface device or elsewhere) regarding the programming information that needs to be presented for the new row or column. For instance, when scrolling to a new column, programs falling within a new time slot need to be displayed.

Electronic program guides (EPGs) promise to make more manageable, the task of choosing from among the myriad television and other media viewing choices. An interactive application of EPGs builds a user-preference database and uses the preference data to make suggestions, filter current or future programming information to simplify the job of choosing, or even make choices on behalf of the user. For example, the system could record a program without a specific request from the user or highlight choices that it recommends.

A first type of device for building the preference database is a passive one from the standpoint of the user. The user merely makes choices in the normal fashion from raw EPG data and the system gradually builds a personal preference database by extracting a model of the user's behavior from the choices. It then uses the model to make predictions about what the user would prefer to watch in the future. This extraction process can follow simple algorithms, such as identifying apparent favorites by detecting repeated requests for the same item, or it can be a sophisticated machine-learning process such as a decision-tree technique with a large number of inputs (degrees of freedom). Such models, generally speaking, look for patterns in the user's interaction behavior (i.e., interaction with the user-interface (UI) for making selections).

One straightforward and fairly robust technique for extracting useful information from the user's pattern of watching is to generate a table of feature-value counts. An example of a feature is the "time of day" and a corresponding value could be "morning." When a choice is made, the counts of the feature-values characterizing that choice are incremented. Usually, a given choice will have many feature-values. A set of negative choices may also be generated by selecting a subset of shows (optionally, at the same time) from which the choice was discriminated. Their respective feature-value counts will be decremented (or a count for shows not watched incremented). These data are sent to a Bayesian predictor which uses the counts as weights to feature-counts characterizing candidates to predict the probability that a candidate will be preferred by a user. This type of profiling mechanism is described in U.S. patent application Ser. No. 09/498,271, filed Feb. 4, 2000 for BAYESIAN TV SHOW RECOMMENDER, the entirety of which is hereby incorporated by reference as if fully set forth herein. A rule-based recommender in this same class of systems, which build profiles passively from observations of user behavior, is also described in the PCT application, WO 99/01984 published Jan. 14, 1999 for INTELLIGENT ELECTRONIC PROGRAM GUIDE.

Another example of the first type is MbTV, a system that learns viewers' television watching preferences by monitoring their viewing patterns. MbTV operates transparently and builds a profile of a viewer's tastes. This profile is used to provide services, for example, recommending television programs the viewer might be interested in watching. MbTV learns about each of its viewer's tastes and uses what it learns to recommend upcoming programs. MbTV can help viewers schedule their television watching time by alerting them to desirable upcoming programs, and with the addition of a storage device, automatically record these programs when the viewer is absent.

MbTV has a Preference Determination Engine and a Storage Management Engine. These are used to facilitate time-shifted television. MbTV can automatically record, rather than simply suggest, desirable programming. MbTV's Storage Management Engine tries to insure that the storage device has the optimal contents. This process involves tracking which recorded programs have been viewed (completely or partially), and which are ignored. Viewers can "lock" recorded programs for future viewing in order to prevent deletion. The ways in which viewers handle program suggestions or recorded content provides additional feedback to MbTV's preference engine which uses this information to refine future decisions.

MbTV will reserve a portion of the recording space to represent each "constituent interest." These "interests" may translate into different family members or could represent different taste categories. Though MbTV does not require user intervention, it is customizable by those that want to fine-tune its capabilities. Viewers can influence the "storage budget" for different types of programs. For example, a viewer might indicate that, though the children watch the majority of television in a household, no more than 25% of the recording space should be consumed by children's programs.

A second type of device is more active. It permits the user to specify likes or dislikes by grading features. These can be scoring feature-value pairs (a weight for the feature plus a value; e.g., weight=importance of feature and value the preferred or disfavored value) or some other rule-specification such as favorite programs, combinations of feature-value pairs like "I like documentaries, but not on Thursday which is the night when the gang comes over." For example, the user can indicate, through a user interface, that dramas and action movies are favored and that certain actors are disfavored. These criteria can then be applied to predict which, from among a set of programs, would be preferred by the user.

As an example of the second type of system, one EP application (EP 0854645A2), describes a system that enables a user to enter generic preferences such as a preferred program category, for example, sitcom, dramatic series, old movies, etc. The application also describes preference templates in which preference profiles can be selected, for example, one for children aged 10-12, another for teenage girls, another for airplane hobbyists, etc.

A third type of system allows users to rank programs in some fashion. For example, currently, TIVO® permits user's to give a show up to three thumbs up or up to three thumbs down. This information is similar in some ways to the second type of system, except that it permits a finer degree of resolution to the weighting given to the feature-value pairs that can be achieved and similar to the first type except the expression of user taste in this context is more explicit. (Note, this is not an admission that the Bayesian technology discussed in U.S. patent application Ser. No. 09/498,271 combined with user-ranking, as in the third type of system, is in the prior art.)

A PCT application (WO 97/4924 entitled System and Method for Using Television Schedule Information) is an example of the third type. It describes a system in which a user can navigate through an electronic program guide displayed in the usual grid fashion and select various programs. At each point, he/she may be doing any of various described tasks, including, selecting a program for recording or viewing, scheduling a reminder to watch a program, and selecting a program to designate as a favorite. Designating a program as a favorite is for the purpose, presumably, to implement a fixed rule such as: "Always display the option of watching this show" or to implement a recurring reminder. The purpose of designating favorites is not clearly described in the application. However, more importantly, for purposes of creating a preference database, when the user selects a program to designate as a favorite, she/he may be provided with the option of indicating the reason it is a favorite. The reason is indicated in the same fashion as other explicit criteria: by defining generic preferences.

The first type of system has the advantage of being easier on the user since the user does not have to provide any explicit data. The user need merely interact with the system. For any of the various machine-learning or predictive methods to be effective, a substantial history of interaction must be available to build a useful preference database. The second and third types have the advantage of providing explicit preference information. The second is reliable, but not perfect as a user may have a hard time abstracting his own preferences to the point of being able to decide which criteria are good discriminators and what weight to give them. The third does not burden the user and probably provides the best quality of information, but can be a burden to generate and still may not contain all the information that can be obtained with the second and also may require information on many shows like the first.

SUMMARY OF THE INVENTION

Briefly, an electronic programming guide (EPG) system employs a preference engine and processing system that combines explicit rule profile, history profile, and feedback profile data to generate new predictions. Television shows are presumed to be indexed by many features. These features are extracted and counted for TV shows watched (implicit profile), and for TV shows rated by the viewer (feedback profile). These profiles are straightforward to combine with suitably greater weight being given to the feedback information. In addition, explicit profiles can make recommendations that stand alone or may be used to modify recommendations arising from either of the other two sources. The modifications may take the form of additive or multiplicative changes to the existing recommendations or some other suitable mathematical form.

The invention will be described in connection with certain preferred embodiments, with reference to the following illustrative figures so that it may be more fully understood.

With reference to the figures, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

DETAILED DESCRIPTION OF THE PREFERRED EMBODIMENTS

Figure 1:
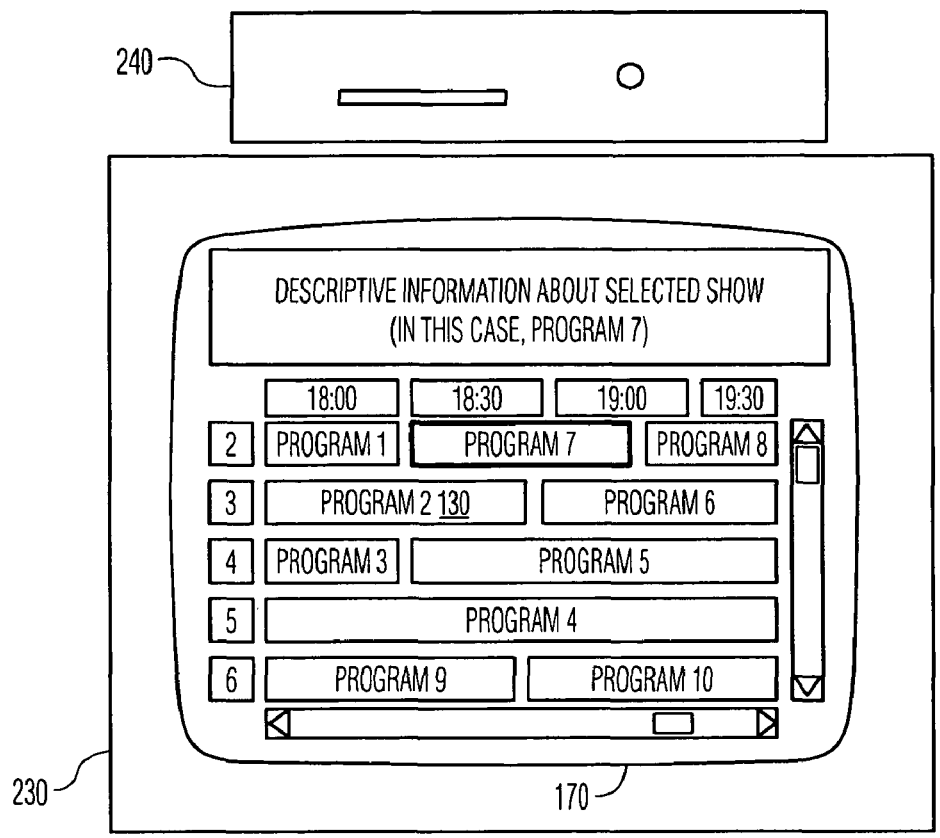
FIG. 1 shows a television/monitor displaying an EPG, with a computer to generate the EPG display, and an interaction interface suitable for use with embodiments of the invention.
Figure 2:
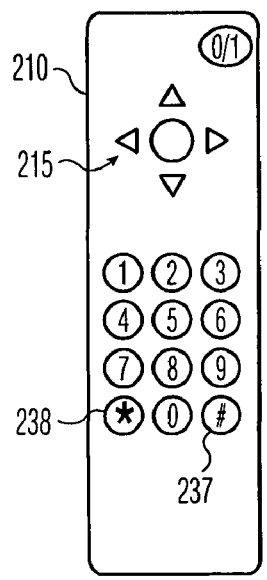
FIG. 2 shows a remote control suitable for use with UI embodiments of the invention.
Figure 3:
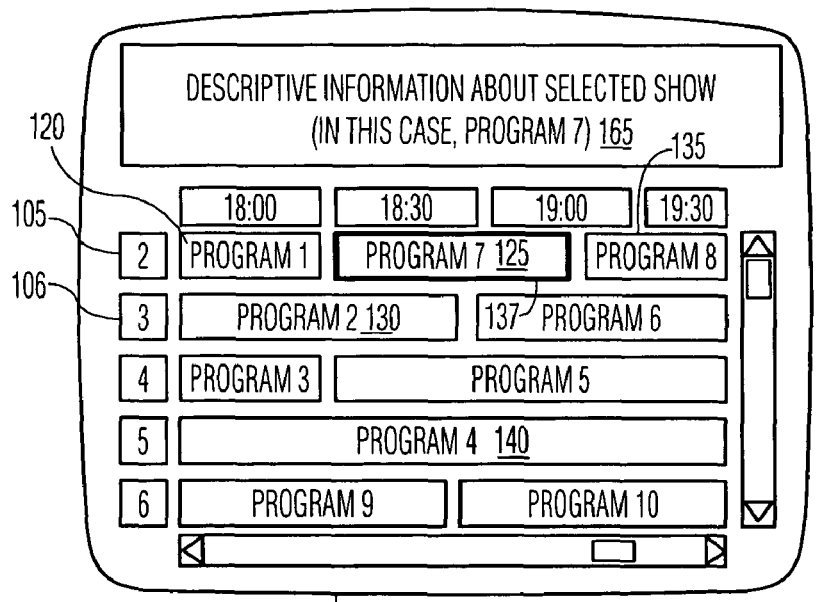
FIG. 3 shows an EPG display suitable for use with UI embodiments of the invention.

Referring to FIGS. 1-4 the invention relates to the environment of electronic program guides (EPGs). In the context of televisions, EPG is applied loosely to various features that can be delivered using a database of program information. The program information may include titles and various descriptive information such as a narrative summary, various keywords categorizing the content, etc. In an embodiment, a computer 240 sends program information to a television 230. The program information can be shown to the user in the form of a time-grid display 170 similar to the format commonly used for existing cable television channel guides. In the time-grid display 170, various programs are shown such as indicated by bars at 120, 125, 130, 135, and 140. The length of each bar (120-140) indicates a respective program's duration and the start and end points of each bar indicate the start and end times, respectively, of each respective program. A description window 165 provides detailed information about a currently selected program. The currently selected program, Program 7 at 125, is indicated by, for example, highlighting a colored border 137 around the currently selected program item. Various devices may be used to select programs, such as cursor keys 215 on remote control 210.

Figure 4:
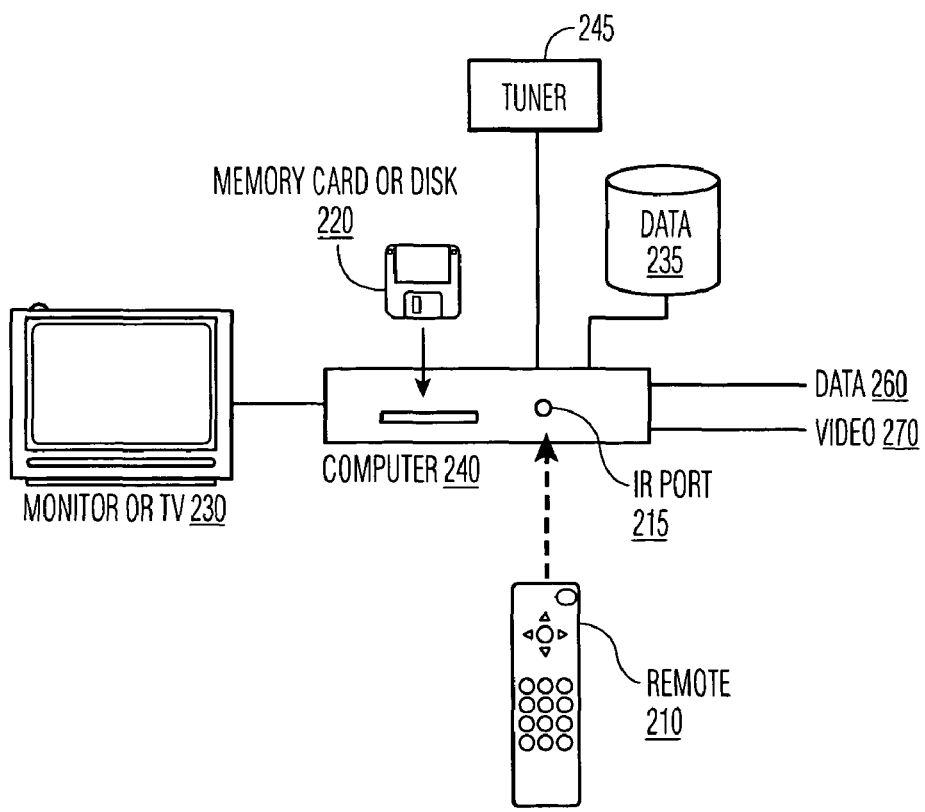
FIG. 4 shows a layout of physical components through which various embodiments of the invention may be realized.

Referring now also to FIG. 4, the computer 240 may be equipped to receive the video signal 270 and control the channel-changing function, and to allow a user to select channels through a tuner 245 linked to the computer 240 rather than through the television's tuner 230. The user can then select the program to be viewed by highlighting a desired selection from the displayed program schedule using the remote control 210 to control the computer. The computer 240 has a data link 260 through which it can receive updated program schedule data. This could be a telephone line connectable to an Internet service provider or some other suitable data connection. The computer 240 has a mass storage device 235, for example a hard disk, to store program schedule information, program applications and upgrades, and other information. Information about the user's preferences and other data can be uploaded into the computer 240 via removable media such as a memory card or disk 220.

Note that many substitutions are possible in the above example hardware environment and all can be used in connection with the invention. The mass storage can be replaced by volatile memory or non-volatile memory. The data can be stored locally or remotely. In fact, the entire computer 240 could be replaced with a server operating offsite through a link. Rather than using a remote control to send commands to the computer 240 through an infrared port 215, the controller could send commands through a data channel 260 which could be separate from, or the same as, the physical channel carrying the video. The video 270 or other content can be carried by a cable, RF, or any other broadband physical channel or obtained from a mass storage or removable storage medium. It could be carried by a switched physical channel such as a phone line or a virtually switched channel such as ATM or other network suitable for synchronous data communication. Content could be asynchronous and tolerant of dropouts so that present-day IP networks could be used. Further, the content of the line through which programming content is received could be audio, chat conversation data, web sites, or any other kind of content for which a variety of selections are possible. The program guide data can be received through channels other than the separate data link 260. For example, program guide information can be received through the same physical channel as the video or other content. It could even be provided through removable data storage media such as memory card or disk 220. The remote control 210 can be replaced by a keyboard, voice command interface, 3D-mouse, joystick, or any other suitable input device. Selections can be made by moving a highlighting indicator, identifying a selection symbolically (e.g., by a name or number), or making selections in batch form through a data transmission or via removable media. In the latter case, one or more selections may be stored in some form and transmitted to the computer 240, bypassing the display 170 altogether. For example, batch data could come from a portable storage device (e.g. a personal digital assistant, memory card, or smart card). Such a device could have many preferences stored on it for use in various environments so as to customize the computer equipment to be used.

Figure 5:
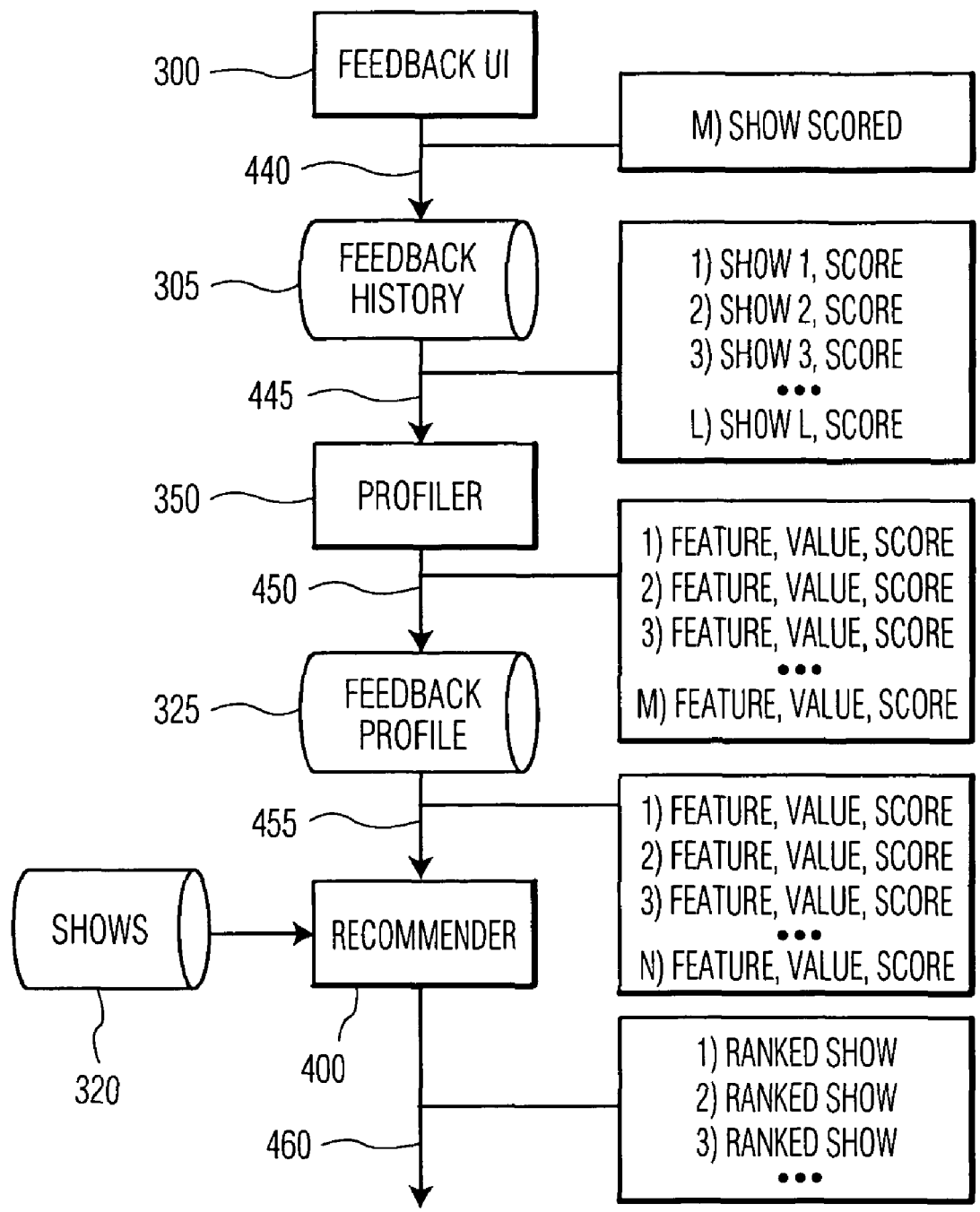
FIG. 5 illustrates the flow of data in feedback-based profilers according to an embodiment of the invention.

Referring now to FIG. 5, in a system of the third type in which the user provides feedback to rank a choice as liked or disliked and optionally to a degree. For example, the Tivo® system uses 1, 2, and 3, or a score from 1-7 with 4 being neutral. A user interface (UI) 300 is used to list programs and accept the feedback information. Alternatively, the UI 300 may be a simple prompt that requests the user to give feedback on a program when the program either ends or when the user switches away from the program. Preferably, the prompt-type would be subject to a preference set that would allow the user to override the prompting in some or all situations if desired.

The information generated by each instance of the feedback UI 300 is one or more choices (shows, if it is a television database) 440 with a score associated with the choice. This is used to charge a feedback history file 305 which can contain a large number of such entries. The feedback data 445 may then be applied to a profiler 350. Alternatively the data can be stored in reduced form by reducing it in a profiler 350 first and then storing in a feedback profile database 325. The reduction may be a set of feature-value pairs 450, each with a ranking as described in Ser. No. 09/498,271, filed Feb. 4, 2000 for BAYESIAN TV SHOW RECOMMENDER. A given choice may give rise to a number (M) feature value pairs 450 with corresponding scores. Preferably, the user rates programs that are both liked and disliked so that both positive and negative feedback are obtained. If only positive feedback is acquired, say because feedback is only provided for programs selected for viewing, then the negative factors may not populate the database. This can be improved then, by having the system generate a set of negative choices by selecting a subset of shows available at the same the choice was made. Preferably, as stated, the user provides a balance of positive and negative feedback and the automatic sampling of negative choices is not required. Their respective feature-value counts would be decremented. This data stored over many choices may be stored in the feedback profile 325 database. The entire body of N records 455 is then available when the recommender 400 makes recommendations based on a list of candidates derived from a show database 320. The end result of this process is a filtered or sorted list 460 of choices available from the show database 320. The recommender may be a Bayesian filter or any other predictor.

Figure 6:
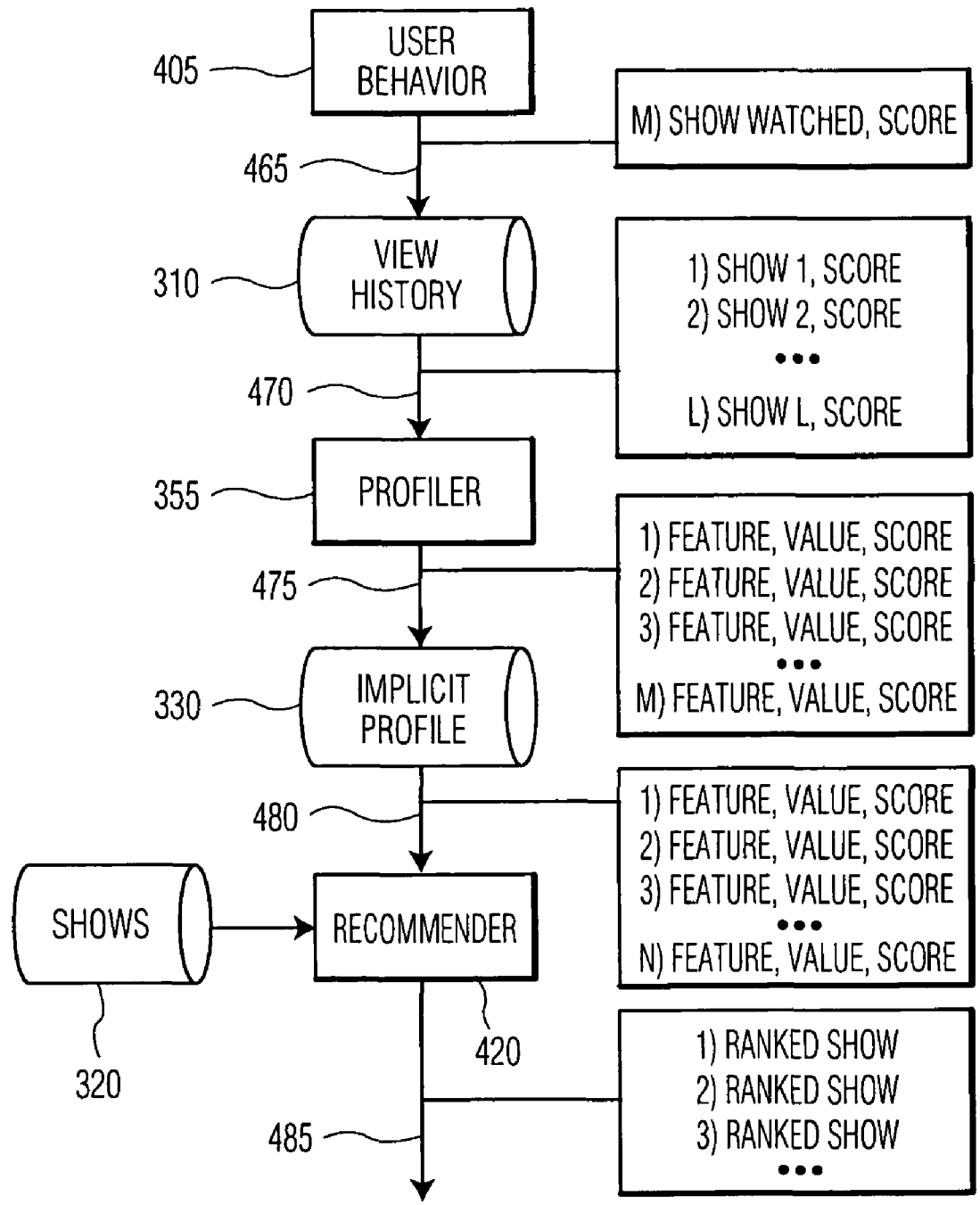
FIG. 6 illustrates the flow of data in view-history-based profilers according to an embodiment of the invention.

Referring to FIG. 6, a very similar process as in FIG. 5 may be used to generate a feature-value pair profile database. This predictor is of the first type described in the background section. Here, a user's selection of a program choice is inferred to indicate a positive score for a program choice. The result of a given choice by a user is a particular program 465 optionally with an attending score. This result can also include a score which may be inferred from the way the user responded. If the user watched the program to completion, the score may be high and if watched for only a short time, the score could be negative. If the program were watched for a period between these two, the score could be a middle magnitude. Alternatively, a watched program could receive a positive score and a random sample of unwatched programs (optionally, at the same time) a negative score.

The view history database 310 stores the shows and scores. The records 470 are supplied to a profiler 355 which generates feature-value pairs with attending scores 475, which may be stored in an implicit profile database 330. The contents 480 of the implicit profile database 330 are then available to a recommender 420 which combines them with data from current shows 320 to generate recommendations 485.

In the example embodiments of FIGS. 5 and 6, we have assumed a Bayesian recommender. It is also possible to use other types of predictive techniques, which would require the alteration of the intermediate data streams. For example, a decision-tree technique would not generate feature-value pairs but rather search the corpus of choices and scores for the feature that is the best discriminator making that the root of the tree, and then searching for the penultimate discriminators to define branches of the tree, and so on. A neural-net type of model is also another example and its input vector set would simply be the show-score data and the stored data, the weights on its interconnects.

Figure 7:
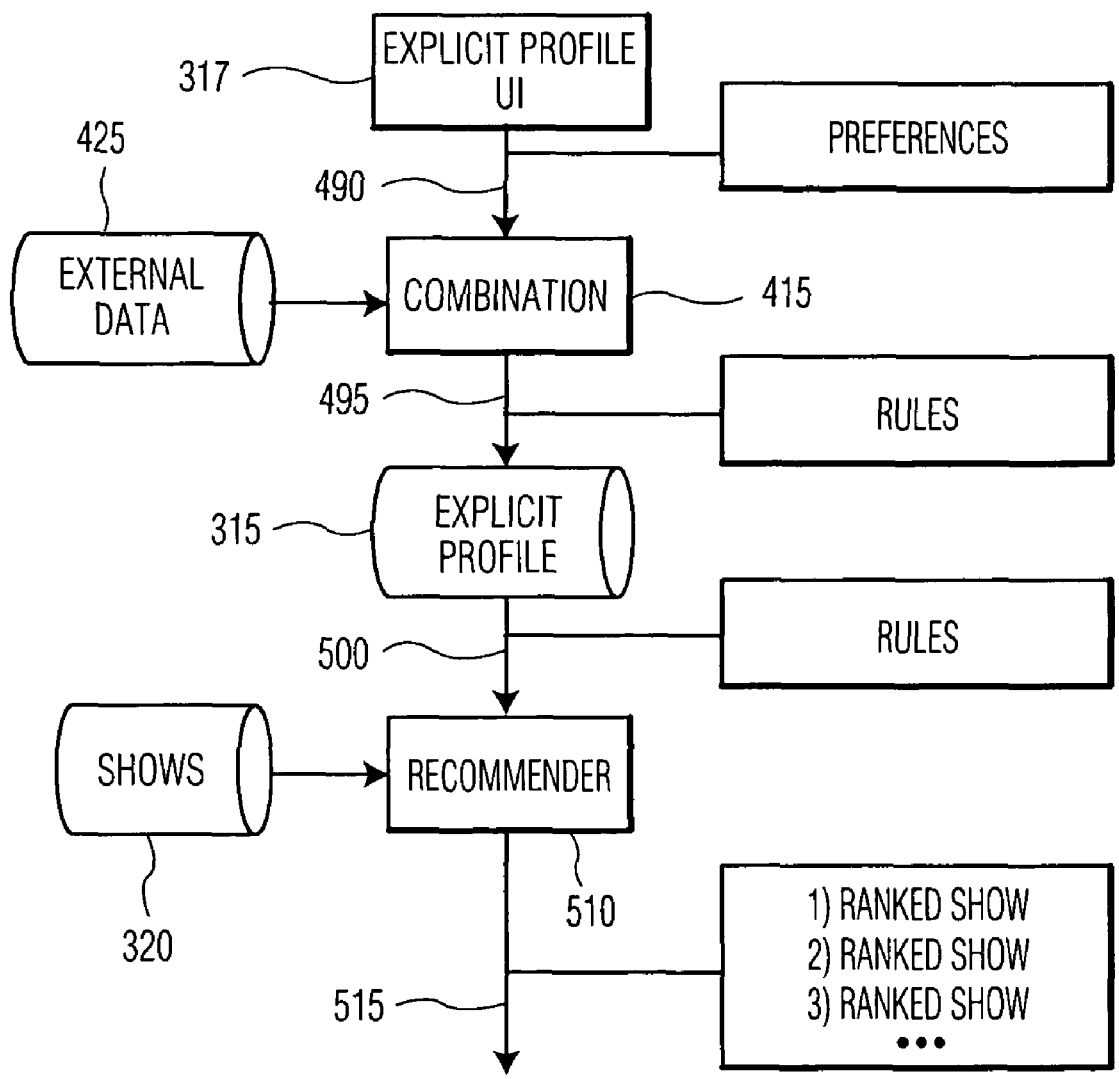
FIG. 7 illustrates the flow of data in explicit-based profilers according to an embodiment of the invention.

Referring to FIG. 7, an explicit profile 315 is formed by having a user interact with a UI 317 to indicate preferences. As an example, the result may be the explicit indication of feature-value pairs with associated scores 490. In this case, these feature-value pairs may be weighted by the user as well. Thus, a user might be asked to indicate how important the particular feature and/or feature-value pair is in his/her decision-making. The resulting rules may be stored in an explicit profile database 315 which may then be used by a recommender 510, such as Bayesian recommender or any other suitable type. Optionally, the rules 490 may be augmented/modified by combination 415 with external data 425 using collaborative filtering techniques. The result again, as in the previous embodiments, is a list of show recommendations 515.

The two types of recommendation processes illustrated in FIGS. 5 and 6 may be joined at an intermediate step if their input vectors (to the recommender) are the same. For example, if both processes will use Bayesian filtering, the input vectors will be feature-value pairs with attending scores. These may be combined in an arithmetic or weighted sum and then applied directly to a single recommender.

Figure 8:
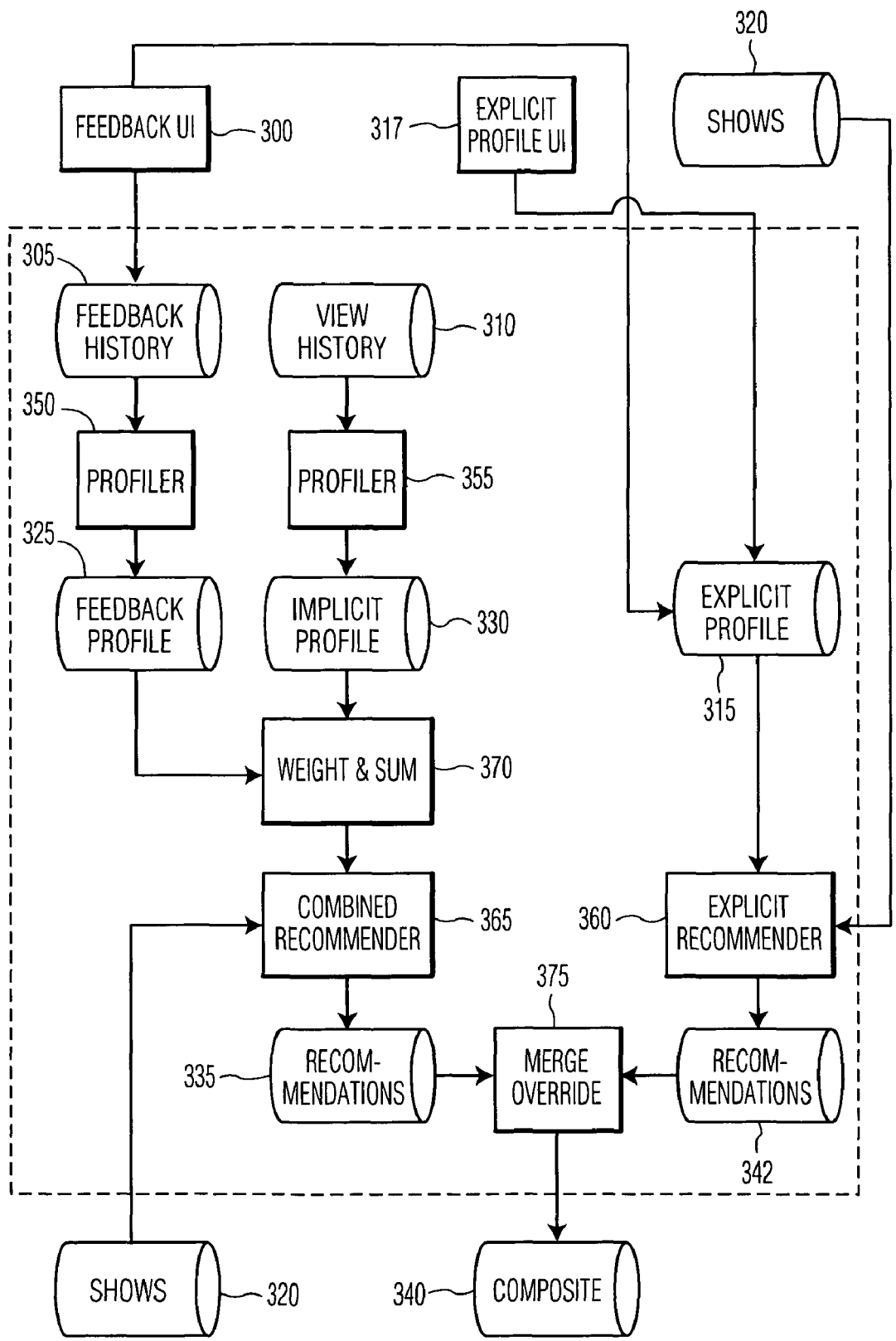
FIG. 8 illustrates the combination of three different types of profile data to provide a combined recommendation process according to an embodiment of the invention.

Referring now to FIG. 8, feature value pairs from each of the feedback profile 325 and the implicit profile 330 are applied to a process 370 that weights and sums the two sets of feature-value pair/score vectors. Preferably, the feedback profile data are provided greater weight than the implicit profile data. A combined recommender 365 can then make recommendations 335. These may be used directly to select shows.

In a further embodiment, also illustrated in FIG. 8, the recommendations from combined feedback and implicit profiles are combined with recommendations based on an explicit profile. The explicit profile recommendations 342 are generated in the fashion employed in the embodiment of FIG. 7 and applied to a merge/override process 375 to produce recommendations 340. The recommendations from the previously-discussed combination of implicit and explicit profiles are also applied to the merge/override process 375. The merge/override process 375 combines the two sets of recommendations as follows.

Each set of recommendations may be represented as a list of choices with corresponding confidence levels. For example, a high confidence level indicates that the recommender generated a strong indication that the choice would be preferred by the user. The combination of the two sets may be a weighted average, with the explicit recommendations receiving greater weight. Thus, a show whose confidence was 90% in the explicit profile's process and 75% in the combined implicit and feedback profiles' process, may be weight-averaged to produce a value of 85%. Preferably, the merge/override process 375 overrides a weighted average if the two are highly disparate. In such a case, the explicit profile may be favored (i.e., trump the combined implicit and feedback profile recommendations) or the weighting corresponding to the difference to produce much greater emphasis on the explicit as the divergence increases. The Still referring to FIG. 8, in another embodiment, the feedback UI 300 may display the explicit profile recommendations on its display. For example, if a user just finished watching a show and was prompted for a rating, the explicit profile's rating of that show could be shown alongside or after the user rated the show. If there were a disparity the user could request to see the rules that generated that result and selectively make corrections. Alternatively, the system could automatically expose those rules that generated the result when there was a threshold disparity between the two ratings. Thus, a conditional link to the explicit profile UI 315 may be generated when the user is in the feedback UI 300.

Figure 9:
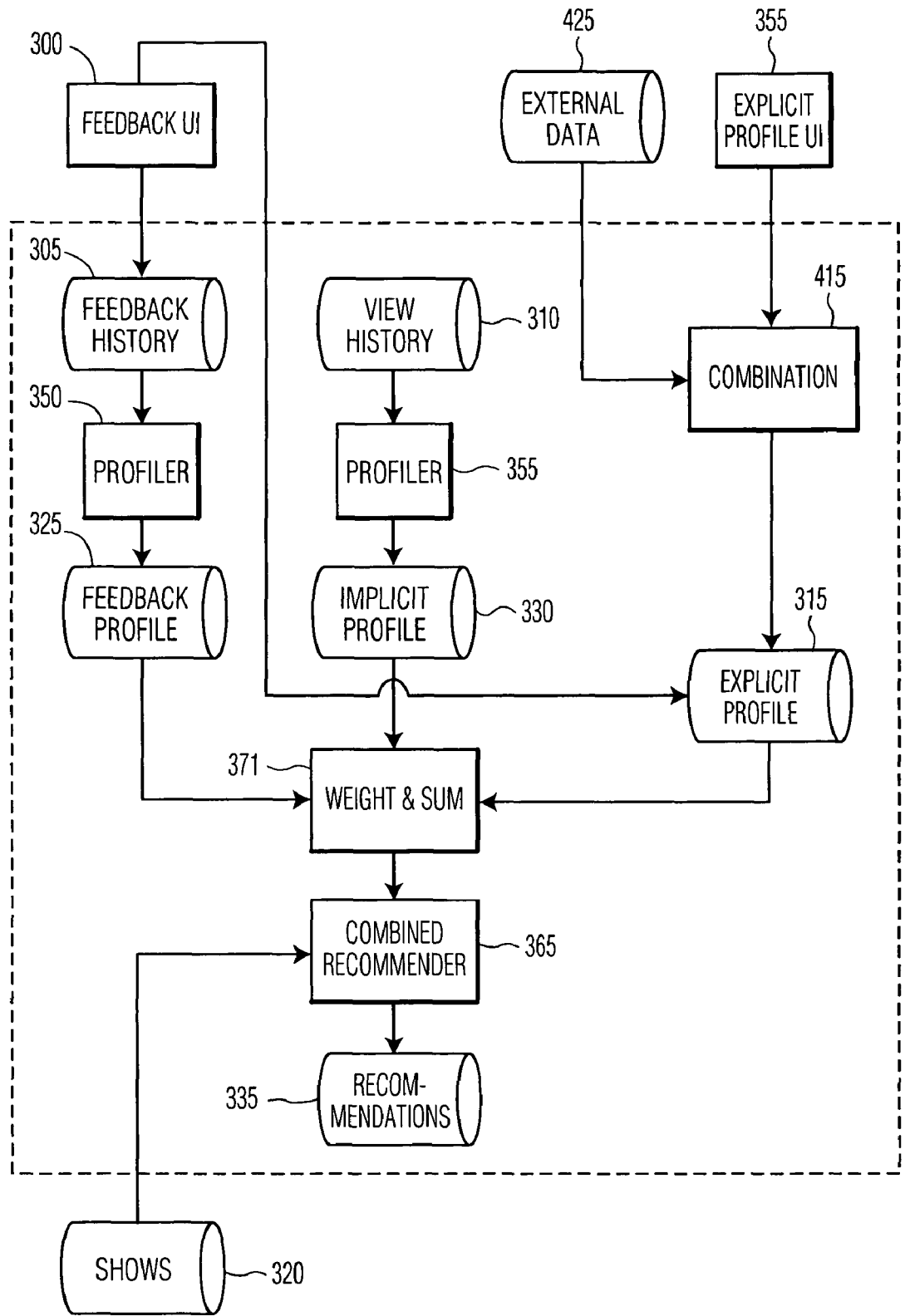
FIG. 9 illustrates the combination of three different types of profile data to provide a combined recommendation process according to another embodiment of the invention.

Referring now to FIG. 9, in a mechanism for combining profiles that is similar to that of FIG. 8, the inputs to the profilers are all assumed to be essentially of the same type. For example, all may be feature vectors with scores or all may be rated choices. For example, assume the inputs are feature-value pairs with corresponding ranking. Each may then be combined in a combined weight and sum processor 371. The combined profile data may then be supplied to a combined recommender 365.

The weight and sum process could provide various ways of combining the vector sets. For one thing, if there is a head-to-head collision between explicit profile vectors and implicit or feedback profile vectors, one may trump the other or, optionally, the user could be prompted to attempt to resolve the discrepancy. Note that the output of the weight and sum process 371 could be performed periodically and the results stored until used for recommendations.

Referring still to FIG. 9, it is possible to use collaborative filtering techniques at various points in the processes of FIGS. 8 and 9. External user preference data of all three forms, explicit, implicit, and feedback, can be combined with similar data synthesized from the data of many users using known techniques. In the example of FIG. 9 the combination of explicit profile data with external data is illustrated but this could be done with any other or all three classes of user preference data.

Another possible way to combine data where the input vectors for the explicit recommender are not of the same form as either of the other two types is to generate show ratings using the explicit recommender. Then the show ratings can be fed to the decision tree, neural network, or other predictor and combined into one body of input vectors to a single recommender. Alternatively, if for example a Bayesian recommender were used, the explicit profile recommendations could be reduced appropriately by a profiler to yield feature-value rating vectors which can be combined with those of the implicit and feedback profiles. Then the combined set can be fed to a single Bayesian recommender.

Figure 10:
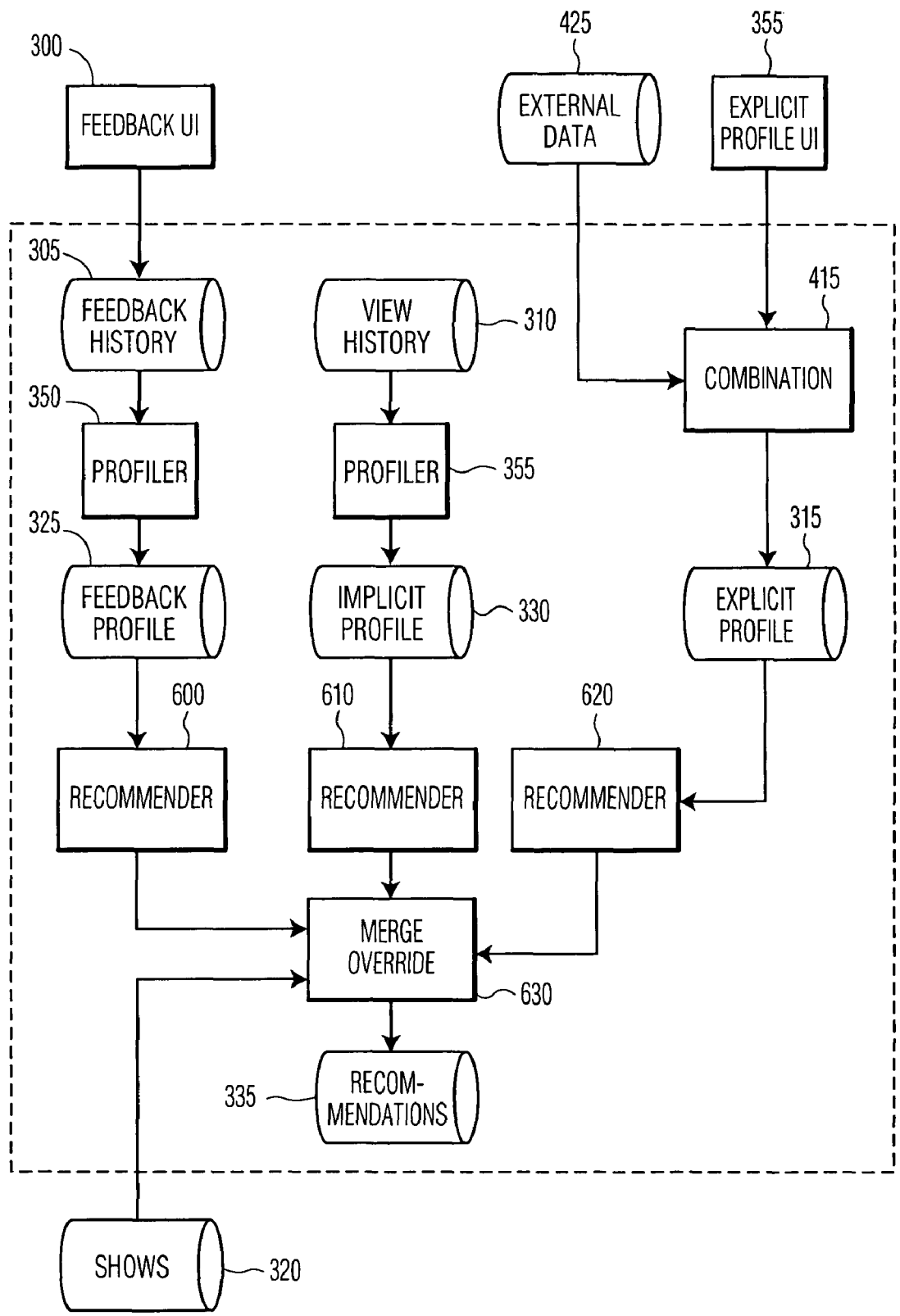
FIG. 10 illustrates the combination of three different types of profile data to provide a combined recommendation process according to still another embodiment of the invention.

Referring to FIG. 10, in another embodiment, each type of profile 325, 330, and 315 is fed to a corresponding recommender 600, 610, and 620. In this embodiment, it is assumed all three types of recommenders have different types of inputs. As discussed with respect to the embodiment of FIG. 8, the different recommendations can still be combined by a single merge override process 630 to make the final recommendations.

It is clear from the above description that the identical techniques of combining disparate profile data may be applied in other contexts than television EPGs. For example, the same techniques could be applied to generate favorites for web-surfing or media forms other than television such as radio broadcasts. Library browsing is another example. One may envision an online library or journal article database where precisely the same techniques may be employed to limit the range of choices. The above system could be used to customize the user interfaces of web sites that provide news articles or sell products, to name a couple of examples.

It will be evident to those skilled in the art that the invention is not limited to the details of the foregoing illustrative embodiments, and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. An automated recommendation system, comprising a processor connected to receive resource data defining available resources and at least two sets of profile data, each defining a user's preferences with respect to the resources;
each of the sets of profile data being derived from a different class of interaction of the user with a first portion of the resource data and usable to predict a given resource's desirability based on each of the sets;
the processor being adapted to:
generate at least two sets of predictions based on one or a combination of the sets of profile data, and
combine the predictions by weight-averaging corresponding ones from each of the at least two sets of predictions.

2. A system as in claim 1, wherein
the processor is further adapted to:
generate a weighted sum of corresponding records from each of the sets of profile data to generate a single combined set of profile data, and
generate at least one of the sets of predictions from the single combined set.

3. A system as in claim 2, wherein
the processor is connected to control a delivery of resources corresponding to the resource data and responsively to the predictions.

4. A system as in claim 1, wherein
the processor is connected to control a delivery of resources corresponding to the resource data and responsively to the predictions.

5. A system as in claim 1, wherein
the at least two profile data sets include
a feedback data set derived from ratings provided by the user with respect to a particular resource in the resource data.

6. A system as in claim 1, wherein
the at least two profile data sets include
an implicit data set derived from machine-observation of a user's resource use history, whereby the implicit data reflects the user's selections of resources to use.

7. A system as in claim 1, wherein
at least one set of the at least two profile data sets comprises input vectors, and
the input vectors each include feature-value pairs.

8. A system as in claim 1, wherein
at least one set of the at least two profile data sets comprises input vectors, and
the input vectors include feature-value pairs and a rating value.

9. A method of recommending resources, comprising:
generating by a processing device, at least two sets of profile data based on expressed preferences of a user with respect to the resources, each being usable to predict a given resource's desirability based on each of the sets;
generating by a processing device, at least two sets of predictions based on one or a combination of the sets of profile data; and
combining, by a processing device, the predictions by weight-averaging corresponding ones from each of the at least two sets of predictions.

10. A method as in claim 9, further comprising:
generating a weighted sum of corresponding records from each of the sets of profile data to generate a single combined set of profile data; and
generating at least one of the sets of predictions from the single combined set.

11. A method as in claim 10, further comprising
controlling a delivery of resources corresponding to the resource data responsively to the predictions.

12. A method as in claim 9, further comprising
controlling a delivery of resources corresponding to the resource data responsively to the predictions.

13. A method as in claim 9, wherein
generating the at least two sets of profile data includes
generating a feedback data set by accepting ratings from the user with respect to a particular resource in the resource data.

14. A method as in claim 9, wherein
generating the at least two sets of profile data includes
generating an implicit data set by observing the user's resource use history, whereby the implicit data reflects the user's selections of resources to use.

15. A method as in claim 9, wherein
at least one set of the at least two sets of profile data comprises input vectors, and
the input vectors each include feature-value pairs.

16. A method as in claim 9, wherein
at least one set of the at least two sets of profile data comprises input vectors, and
generating the at least two sets of profile data includes generating feature-value pairs and a rating value.

17. A method as in claim 9, wherein:
the sets of profile data includes:
a set of explicit profile data indicating express indications by a user of preferred classes of programming rather than indications by the user of particular resources that are preferred;
a feedback data set derived from ratings provided by the user with respect to a particular resource in the resource data; and an implicit data set derived from machine-observation of a user's resource use history, whereby the implicit data reflects the user's selection.

18. An automated recommendation system, comprising:

a processor connected to receive resource data defining available resources and sets of profile data, each defining a users preferences with respect to the resources;

the sets of profile data including:

a set of explicit profile data indicating express indications by a user of preferred classes of programming rather than indications by the user of particular resources that are preferred;

feedback data set derived from ratings provided by the user with respect to a particular resource in the resource data; and an implicit data set derived from machine-observation of a users resource use history, whereby the implicit data reflects the user's selection;

the processor being adapted to generate at least two sets of predictions based on one or a combination of the sets of profile data, each of the predictions including a confidence level;

the processor being further adapted to combine the predictions by weight-averaging corresponding ones from each of the at least two sets of predictions.

19. A system as in claim 18, wherein the processor is further adapted to adjust weights of the weight averaging responsively to a difference between the corresponding ones.

20. A system as in claim 18, wherein the processor is further adapted to selectively override the weight averaging responsively to a difference between the corresponding ones.

21. A method of automatically recommending resources, comprising:

receiving resource data defining available resources and sets of profile data, each defining user preferences with respect to the resources;

the sets of profile data including:

a set of explicit profile data indicating express indications by a user of preferred classes of programming rather than indications by the user of particular resources that are preferred;

a feedback data set derived from ratings provided by the user with respect to a particular resource in the resource data; and an implicit data set derived from machine-observation of a user's resource use history, whereby the implicit data reflects the user's selection;

generating at least two sets of predictions based on one or a combination of the sets of profile data, each of the predictions including a confidence level; and combining the predictions by weight-averaging corresponding ones from each of the at least two sets of predictions to produce a combined set.

22. A method in claim 21, wherein combining the predictions includes adjusting weights of the weight averaging responsively to a difference between the corresponding ones.

23. A method as in claim 21, wherein combining the predictions includes selectively overriding the weight averaging responsively to a difference between the corresponding ones such that a prediction of a one of the sets of predictions is included in the combined set and a prediction of the other of the sets of predictions is excluded.

24. A method of combining profile data, comprising:

generating first profile data by receiving through a user interface user preferences in the form of expressed generalized preferences corresponding classes of resources;

generating second profile data by receiving user preferences in the form of rating data corresponding to specific resources; and applying the first and second profile data to respective prediction engines to produce first and second prediction results and combining the first and second results.

25. A method as in claim 24, further including combining the first and second profile data, wherein combining the first and second profiles includes weight averaging corresponding ones of the profile data.

26. A method as in claim 24, wherein combining respective results includes selectively weight averaging corresponding ones of the predictions.

* * * * *